(12) United States Patent
Mehlmann et al.

(10) Patent No.: US 10,518,508 B2
(45) Date of Patent: *Dec. 31, 2019

(54) MULTILAYER STRUCTURES CONTAINING BIOPOLYMERS

(71) Applicants: Florence Mehlmann, Berwyn, PA (US); Robert J. Barsotti, Drexel Hill, PA (US); Charles C. Crabb, Royersford, PA (US); Thomas H. Richards, New Britain, PA (US); Steven B. Lacock, Perkiomenville, PA (US); Mark A. Aubart, West Chester, PA (US); Adam N. Toft, Norristown, PA (US); Arkema France, Colombes (FR)

(72) Inventors: Florence Mehlmann, Berwyn, PA (US); Robert J. Barsotti, Drexel Hill, PA (US); Charles C. Crabb, Royersford, PA (US); Thomas H. Richards, New Britain, PA (US); Steven B. Lacock, Perkiomenville, PA (US); Mark A. Aubart, West Chester, PA (US); Adam N. Toft, Norristown, PA (US)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/416,849

(22) PCT Filed: Jul. 26, 2013

(86) PCT No.: PCT/US2013/052167
§ 371 (c)(1),
(2) Date: Jan. 23, 2015

(87) PCT Pub. No.: WO2014/018817
PCT Pub. Date: Jan. 30, 2014

(65) Prior Publication Data
US 2015/0174868 A1 Jun. 25, 2015

Related U.S. Application Data

(60) Provisional application No. 61/676,364, filed on Jul. 27, 2012.

(51) Int. Cl.
B32B 27/08 (2006.01)
B32B 27/20 (2006.01)
B32B 7/02 (2019.01)
C08L 33/12 (2006.01)
B32B 27/36 (2006.01)
B32B 27/30 (2006.01)
B32B 27/06 (2006.01)
B32B 5/18 (2006.01)

(52) U.S. Cl.
CPC ............... *B32B 27/08* (2013.01); *B32B 5/18* (2013.01); *B32B 7/02* (2013.01); *B32B 27/065* (2013.01); *B32B 27/20* (2013.01); *B32B 27/308* (2013.01); *B32B 27/36* (2013.01); *C08L 33/12* (2013.01); *B32B 2307/71* (2013.01); *Y10T 428/249991* (2015.04); *Y10T 428/254* (2015.01); *Y10T 428/263* (2015.01); *Y10T 428/269* (2015.01); *Y10T 428/31797* (2015.04); *Y10T 428/31924* (2015.04); *Y10T 428/31928* (2015.04)

(58) Field of Classification Search
CPC .... B32B 27/065–308; B32B 5/18; B32B 7/12
See application file for complete search history.

(56) References Cited

U.S. PATENT DOCUMENTS

| | | | | |
|---|---|---|---|---|
| 3,944,631 | A * | 3/1976 | Yu | C08F 285/00 424/69 |
| 5,270,397 | A * | 12/1993 | Rhein | C08F 285/00 525/281 |
| 7,666,946 | B2 | 2/2010 | Brake et al. | |
| 7,977,397 | B2 * | 7/2011 | Cheung | C08J 9/0061 521/134 |
| 8,221,001 | B2 | 7/2012 | Morita et al. | |
| 2002/0160201 | A1 | 10/2002 | Ohkura et al. | |
| 2003/0024637 | A1 | 2/2003 | Min | |
| 2004/0137252 | A1 | 7/2004 | Bonnet et al. | |
| 2005/0105191 | A1 | 5/2005 | Baer et al. | |

(Continued)

FOREIGN PATENT DOCUMENTS

| | | | |
|---|---|---|---|
| JP | 2007125836 A * | 5/2007 | |
| JP | 2009066915 | 4/2009 | |

(Continued)

OTHER PUBLICATIONS

Machine translation of JP2010-052308. Retrieved Jun. 26, 2016.*

(Continued)

*Primary Examiner* — Prashant J Khatri
(74) *Attorney, Agent, or Firm* — Thomas F. Roland

(57) ABSTRACT

The invention relates to a multi-layer structure having at least one inner layer containing an alloy of a biopolymer and an acrylic polymer and at least one outer layer containing a thermoplastic or thermoset polar polymer matrix. The combination of outer polar layer and an inner biopolymer/acrylic layer provides improved properties, such as improved adhesion, and improved mechanical properties. The multi-layer structure may be in the form of a sheet, a film, a tube or pipe, or a profile, and could be used by itself or as a cap-layer over a substrate.

18 Claims, No Drawings

(56) References Cited

U.S. PATENT DOCUMENTS

| | | |
|---|---|---|
| 2006/0246292 A1 | 11/2006 | Seeboth et al. |
| 2007/0179218 A1 | 8/2007 | Brake et al. |
| 2007/0276090 A1 | 11/2007 | Aoki et al. |
| 2008/0241242 A1 | 10/2008 | Caruso et al. |
| 2009/0018237 A1 | 1/2009 | Fujii et al. |
| 2009/0093568 A1 | 4/2009 | Lacock et al. |
| 2009/0169844 A1 | 7/2009 | Yamamura et al. |
| 2009/0239433 A1* | 9/2009 | Kurihara ............ B32B 27/36 442/164 |
| 2009/0246434 A1 | 10/2009 | Miyamoto et al. |
| 2010/0267867 A1* | 10/2010 | Cygan ............ C08L 67/04 524/35 |
| 2012/0142823 A1 | 6/2012 | Cygan et al. |
| 2012/0164364 A1 | 6/2012 | Mehlmann |
| 2012/0288679 A1 | 11/2012 | Tabata et al. |
| 2013/0071677 A1 | 3/2013 | Penttinen et al. |
| 2014/0072782 A1 | 3/2014 | Chung et al. |
| 2014/0147644 A1 | 5/2014 | Crabb et al. |

FOREIGN PATENT DOCUMENTS

| | | | |
|---|---|---|---|
| JP | 2009173715 | | 8/2009 |
| JP | 2010052308 A | * | 3/2010 |
| KR | 20120049562 | | 5/2012 |
| KR | 20120049563 | | 5/2012 |

OTHER PUBLICATIONS

Machine translation of JP2007-125836. Retrieved Jun. 26, 2016.*
Iezzi et al. "Acrylic-fluoropolymer mixtures and their use in coatings". Progress in Organic Coatings, 40, (2000); pp. 55-60.*

* cited by examiner

MULTILAYER STRUCTURES CONTAINING BIOPOLYMERS

This application claims benefit, under U.S.C. § 119 or § 365 of PCT Application Number PCT/US2013/052167, filed Jul. 26, 2013, and U.S. Provisional Application No. 61/676,364, filed Jul. 27, 2012.

FIELD OF THE INVENTION

The invention relates to a multi-layer structure having at least one inner layer containing an alloy of a biopolymer and an acrylic polymer, and at least one outer layer containing a polar polymer matrix. The combination of outer polar layer and an inner biopolymer/acrylic layer provides improved properties, such as improved adhesion, and improved mechanical properties.

The multi-layer structure may be in the form of a sheet, a film, a tube or pipe, or a profile, and could be used by itself or as a cap-layer over a substrate.

BACKGROUND OF THE INVENTION

Certain structural plastics, such as high impact polystyrene (HIPS), acrylonitrile/butadiene/styrene (ABS) resins, poly(vinyl chloride) (PVC) resins, thermoplastic olefins (TPO), and the like, exhibit attractive mechanical properties when extruded, molded, or formed into various articles of manufacture. Such articles include, for example, bathtubs, shower stalls, counters, appliance housings and liners, building materials, doors, windows, siding, decking, railings and shutters, lawn and garden articles, marine articles, swimming pool articles, automotive components, and storage articles.

Although these structural plastics offer attractive property characteristics, the properties of their exposed surfaces can be less than ideal. That is, the surfaces of the structural plastics are degraded by light, can be easily scratched, and/or they can be eroded by common solvents. Consequently, it has become a practice in the industry to apply another resinous material over one or both sides of the structural plastic to protect the underlying structural material and provide a surface that can withstand abuse associated with the use environment. Such surfacing materials are called "capstocks".

The capstock generally is much thinner than the structural plastic, typically being about 5 to about 25% of the total thickness of the composite comprising the capstock and structural plastic plies. For example, the thickness of the capstock can be about 0.05 to about 2.5 mm, whereas the thickness of the structural plastic ply can be about 1.0 to about 10 mm, and preferably from greater than 2 mm to 8 mm in thickness.

Polar capstock layers including styrenic-based polymers, polyesters, polycarbonate, and polyvinylidene fluoride have been used over thermoplastic polyurethane (TPU), with specific tie layers, in US 61/623,767.

Biopolymers are finding use as environmentally-friendly alternatives for many common plastics in typical applications, such as in packaging materials and bottling. Biopolymers can be defined either as polymers manufactured from a renewable carbon source, or as polymers that are biodegradable or compostable, or both. Most biopolymers suffer from poor physical properties and poor weatherability. For example polylactic acid is very brittle, resulting in very low impact properties of finished articles. U.S. Pat. No. 7,666,946 and US 2012/0142823 describe the modification of biopolymers with up to 15 percent of an acrylic modifier. U.S. Pat. No. 7,666,946 and US 2012/0142823 describe that biopolymers can be modified to improve properties with up to 15 percent of an acrylic modifier.

JP2008062591A, describes a stretched polylactic acid film laminated with a thin (<50 micron), heat sealable (Tg<70° C.), heat sealed polymer layer.

JP2009066915A describes a multilayer film or sheet formed by laminating a plant-derived resin layer and a rubber reinforcing styrene resin layer. The multilayer structure suffers from limited resistance to UV rays, due to the nature of the described layers.

U.S. application Ser. No. 13/390,625, US 2007/0276090, and US 2009/0018237 describe a blend of PLA matrix, acrylic polymer and a core/shell impact modifier having either a hard core layer or a soft core layer.

It is desired to produce a multilayer structure having a polar thermoplastic or thermoset polymer outer layer over a biopolymer layer that overcomes the problems of the structures of the art.

Surprisingly it has been found that a multilayer structure containing a layer of polar thermoplastic over a layer of a biopolymer/acrylic alloy has excellent physical properties, such as UV resistance, scratch resistance, chemical resistance, as well as good adhesion between juxtaposed layers, excellent impact strength, and ease of manufacture. In one embodiment the adhesion of a cap layer to a substrate is improved by using a biopolymer/acrylic alloy as a middle layer. The inner biopolymer/acrylic layer also improves the impact resistance of the multilayer structure.

As a further benefit, the addition of the biopolymer/acrylic alloy layer to the multilayer structure helps in the compatibility of the structure when used as rework.

SUMMARY OF THE INVENTION

The invention relates to a multilayer structure comprising:
a) at least one outer layer comprising a polar polymer matrix
b) at least one inner layer comprising a biopolymer/acrylic polymer alloy.

The invention further relates to objects formed from the multilayer structure and means for producing these objects.

DETAILED DESCRIPTION OF THE INVENTION

The invention relates to a multi-layer structure in which one or more inner layers contain a biopolymer/acrylic alloy, and the outer layer(s) is a thermoplastic or thermoset polar polymer.

All percentages used herein are weight percentages, unless otherwise specified, and all molecular weight are weight average molecular weights, unless otherwise specified.

Multilayer Sheet Structure

The multilayer structures of the invention include films, sheets, profiles and articles having two or more structural layers. The structures may be planar, curved, angled or of any shape—including pipes, tubes, and hollow structures. By structural layers is meant a layer included in the structure to provide specific properties to the structure. Specifically, the term structural layer is meant to exclude adhesive or tie layers, though these may be present in the structure in addition to the two or more structural layers.

As used herein, the term "layer" refers to each of the two or more different materials that are secured to one another by any appropriate means, such as by inherent tendency of the materials to adhere to one another, or by inducing the materials to adhere by a heating, radiation, chemical, or any appropriate process. The layers may be held together by one or more adhesives or tie layers. A "different" layer means any change in the composition of the layer compared to another layer. Two identical layers could exist in the multilayer structure, as in the case of a three layer structure having an inner core layer and covered on both sides with identical layers.

The terms "inner" and "outer" layers refer to the placement of the layers of the multilayer structure in regards to their exposure to the environment in a final article. The outer layer(s) is the layer to be exposed to the environment on one or both sides of an inner layer. The inner layer as used herein is meant a layer that is not meant to be exposed to the environment in its final use in an article. In a two-layer sheet, for example, the inner layer side will ultimately either be enclosed, or be placed against another material before final use. In the present invention the outer layer(s) have a polar polymer matrix, while at least one inner layer has a matrix containing a biopolymer/acrylic alloy.

The outer polar polymer layer of the invention may be formed by any means, including but not limited to coating, and extrusion. Each outer layer has a thickness of at least 0.5 microns, preferably at least 1 micron, and more preferably from 5 microns to 5 mm. The thinner layers represent dried coatings. Layers that are extruded have a thickness of at least 25 microns, preferably at least 50 microns, and more preferably greater than 75 microns, and most preferably greater than 100 microns. The inner biopolymer/acrylic layer has a thickness of 25 microns, preferably at least 50 microns, and more preferably greater than 75 microns, and most preferably greater than 100 microns. In a preferred embodiment, a polar polymer layer is directly next to a biopolymer/acrylic alloy layer—with no tie layer or adhesive between.

Outer Polar Polymer Layer

The multilayer structure of this invention contains at least one thermoplastic or thermoset polar polymer layer as an outer layer(s). The polar polymer layer contains a polar polymer matrix, the matrix making up at least 30 weight percent of the layer, preferably more than 50 weight percent, and more preferably at least 60 percent by weight. The polar polymer may be used without any additives, thereby making up 100 percent of the outer layer. In the polar polymer matrix, more than 50 weight percent of the matrix is polar polymers, preferably at least 70 weight percent, more preferably at least 85 weight percent, and even including a matrix of 100 weight percent of one or more polar polymers. Useful polar polymers include, but are not limited to acrylic-based polymers, styrenic-based polymers, polyesters, polycarbonate, polyvinylidene fluoride, and thermoplastic polyurethane (TPU), or compatible mixtures thereof. Preferred thermoplastic polar polymers are polyvinylidene fluoride or styrenic-based polymers. Preferred thermoset polar polymers are acrylic, urethane, or epoxy-based polymers. In one embodiment, the polar polymer is not a coating and contains only non-acrylic polar polymer(s). A preferred polar polymer for use in coatings is an acrylic polymer or copolymer.

Acrylic-based polymers, as used herein, is meant to include polymers, copolymers and terpolymers formed from alkyl methacrylate and alkyl acrylate monomers, and mixtures thereof. The alkyl methacrylate monomer is preferably methyl methacrylate, which may make up from greater than 50 to 100 percent of the monomer mixture. 0 to 50 percent of other acrylate and methacrylate monomers or other ethylenically unsaturated monomers, included but not limited to, styrene, alpha methyl styrene, acrylonitrile, and cross-linkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. Alkyl (meth) acrylic acids such as methacrylic acid and acrylic acid can be useful for the monomer mixture. Most preferably the acrylic polymer is a copolymer having 70-99.5 weight percent of methyl methacrylate units and from 0.5 to 30 weight percent of one or more $C_{1-8}$ straight or branched alkyl acrylate units.

Styrenic-based polymers include, but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-butadiene-styrene (MBS) copolymers, styrene-butadiene copolymers, styrene-butadiene-styrene block (SBS) copolymers and their partially or fully hydrogenenated derivatives, styrene-isoprene copolymers, styrene-isoprene-styrene (SIS) block copolymers and their partially or fully hydrogenenated derivatives, and styrene-(meth)acrylate copolymers such as styrene-methyl methacrylate copolymers (S/MMA). A preferred styrenic polymer is ASA. The styrenic polymers of the invention can be manufactured by means known in the art, including emulsion polymerization, solution polymerization, and suspension polymerization. Styrenic copolymers of the invention have a styrene content of at least 10 percent by weight, preferably at least 25 percent by weight.

In one embodiment, the polar polymer has a weight average molecular weight of between 50,000 and 500,000 g/mol, and preferably from 75,000 and 150,000 g/mol, as measured by gel permeation chromatography (GPC). The molecular weight distribution of the acrylic polymer may be monomodal, or multimodal with a polydispersity index greater than 1.5. In a preferred embodiment the polar polymer has a Tg of greater than 70° C.

Biopolymer/Acrylic Polymer Alloy

At least one inner layer of the inventive multi-layer structure contains an alloy of one or more acrylic polymers with one or more biopolymers. The acrylic and biopolymer materials are compatible, semi-miscible, or miscible. They should be capable of being blended in a ratio such that a single intimate mixture is generated without loss of mechanical integrity at usage temperature. The biopolymer acrylic alloy makes up at least 30 percent by weight of the layer, preferably at more than 50 weight percent, more preferably at least 75 weight percent, and most preferably at least 90 weight percent of the inner biopolymer/acrylic layer.

The alloy contains 2 to 95 weight percent, preferably 5 to 90 weight percent, and more preferably 20-80 weight percent of acrylic polymer(s), and 5 to 98 weight percent, preferably 10 to 95 weight percent and more preferably 20 to 80 weight percent biopolymer(s).

"Biopolymer", as used herein is meant to include polymers manufactured from a renewable carbon source, polymers that are biodegradable or compostable, or both. Biopolymers of this invention include, but are not limited to, polyesters, cellulosic esters, polyamides, starch and starch derivatives, shellac, sugars, polypeptides, nucleic acids, zein, cellophane, plastarch, polycaprolactone, polyglycolide, and chitosan.

Useful polyesters include, but are not limited to, polylactic acid, polyhydroxyalkanoates, polycaprolactone, polyesteramide, polybutylene succinate, polyethylene adipate. A preferred polyester is polylactic acid.

Useful cellulosic esters include, but are not limited to: cellulose acetate, cellulose triacetate, cellulose propionate, cellulose acetate propionate, cellulose acetate butyrate, and cellulose acetate phthalate.

The acrylic polymer in the alloy can be one or more of the previously listed acrylic polymers. In one embodiment, the acrylic polymer in the alloy could be an acrylic impact modifier. In another embodiment, the biopolymer/acrylic polymer alloy serves as the matrix polymer.

In one embodiment, the layer containing the biopolymer/acrylic is in a cellular or foamed form.

The acrylic polymer, biopolymer, and optionally any additives (including impact modifiers) can be blended in any order, and by any means known in the art to form the alloy. For example, the components can be dry-blended prior to being melted, or directly melt blended together, such as in an extruder, or intimately mixed in a suitable solvent.

Impact Modifiers

The polar polymer matrix layer and biopolymer/acrylic polymer alloy, may independently contain one or more additives. In one embodiment impact modifiers may be added into the polymer matrix. The impact modifier may be present at a level of from 0 to 80 weight percent, preferably 10 to 45, and more preferably from 20 to 40 weight percent, based on the total layer of matrix polymer and all additives. Impact modifiers useful in the invention include, but are not limited to, core-shell particles, block copolymers, and graft copolymers.

Core-shell impact modifier, as used herein, is a multi-stage, sequentially-produced polymer having a core/shell particle structure of at least two layers. Preferentially, the core-shell modifier comprises three layers made of a hard core layer, one or more intermediate elastomeric layers, and a hard shell layer. The presence of a hard core layer provides a desirable balance of good impact strength, high modulus, and excellent UV resistance, not achieved with a core/shell modifier that possesses a soft-core layer.

"Hard layers" (Tg>0° C., preferably Tg>20° C.) are typically a single composition polymer, but can also include the combination of a small amount of a low Tg seed on which the hard core layer is formed. For example, a small 5% rubber core seed that becomes dispersed into a hard core layer would be included in the invention as a hard core layer. Hard layer can be chosen from any thermoplastic meeting the Tg requirements. Preferably, a hard layer is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Styrenics units include styrene, and derivatives thereof such as, but not limited to, alpha-methyl styrene, and para methyl styrene. In one embodiment the hard layer is all-acrylic.

At least one core or intermediate layer is elastomeric "soft layer", having a Tg of less than 0° C., and preferably less than −20° C. Preferred elastomers include polymers and copolymers of alkyl acrylates, dienes, styrenics, and mixtures thereof. Preferably a soft layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful dienes include, but are not limited to isoprene and butadiene. Useful styrenics include, but are not limited to alpha-methyl styrene, and para methyl styrene.

The outer shell layer can be made of one or more shell layers, having a Tg>0° C., more preferably Tg>20° C. The shell layer may be the same or different composition other "hard layers".

Preferably the multi-stage polymer is a three stage composition wherein the stages are present in ranges of 10 to 40 percent by weight, preferably 10 to 20 percent, of the first stage (a), 40 to 70 percent, preferably 50 to 60, of the second intermediate stage (b), and 10 to 50 percent, preferably 20 to 40, of the final stage (c), all percentages based on the total weight of the three-stage polymer particle.

In one embodiment the core layer is a polymethylmethacrylate-ethylacrylate copolymer, the middle layer is a crosslinked polybutylacrylate-styrene copolymer, and the outer shell is a polymethylmethacrylate-ethylacrylate copolymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

In one embodiment the refractive index of the core/shell particle matches the total refractive index of the matrix. By match is meant that the refractive index of the core/shell particle should be within 0.03 units of the matrix polymer blend, and preferably within 0.02 units.

Other Additives

The polar polymer and biopolymer/acrylic polymer matrix layers of the multilayer structures of this invention may further contain other additives typically present in polymer formulations, including but not limited to, stabilizers, plasticizers, fillers, coloring agents, pigments, antioxidants, antistatic agents, surfactants, toner, refractive index matching additives, additives with specific light diffraction, light absorbing, or light reflection characteristics, and dispersing aids.

In one embodiment, an additive is provided to help prevent degradation of the layer composition upon exposure to radiation, such as high levels of UV radiation or gamma radiation. Useful radiation stabilizers include, but are not limited to poly(ethylene glycol), poly(propylene glycol), butyl lactate, and carboxylic acids such as lactic acid, oxalic acid, acetic acid, or a mixture thereof.

In another embodiment, an additive is provided to achieve specific light manipulation of the layer with specific light diffraction or light reflection characteristics. Useful additives include, but are not limited to polymeric or inorganic spherical particles with a particle size between 0.5 microns and 1,000 microns. In a preferred embodiment, the additive's refractive index is different from that of the matrix polymer, in order to achieve a haze higher than 10%.

Tie-Layers

Layers of the multilayer structure of the invention may optionally be bonded by one or more tie layers or layers of adhesive. In a preferred embodiment, no tie layer or adhesive is used between the layer(s) of polar polymer and biopolymer/acrylic alloy. A tie layer may optionally be used as needed to obtain satisfactory adhesion between the layers or between the multi-layer sheet and a substrate. The tie layer could be provided into the multilayer structure during a coextrusion process, could be extrusion laminated, or can be applied during a lamination, press molding, or injection molding process. Any tie layer has an adhesive affinity to the layers on either side, and can be of any known composition. In one embodiment, the tie layer contains a blend of adhesive compounds in which each component of the blend has a compatible, miscible, or semi-miscible chemistry to one of the layers. In other embodiments, the tie layer is a copolymer having two or more functionalities, where each functionality has an affinity to a different layer.

Manufacture

The multilayer structures of this invention may be produced by any method available in the art, such as by coating, co-extrusion techniques, lamination techniques, thermoforming, or any combination thereof. In one embodiment, co-extrusion is preferred. For acrylic covered biopolymer/acrylic alloy, a coating is preferred.

Co-extrusion is a process in which two or more molten polymeric compositions are simultaneously extruded through a feedblock die or, alternatively, through a multi-manifold die, to form a laminar structure with different functional properties in each layer. Of particular interest is the use of a feedblock die to feed a multimanifold die in a single process, which provides great flexibility in the manufacture of the multilayer structures of the invention.

Lamination is the process of bonding together two or more prefabricated sheet or film layers by the use of adhesives, or by a combination of heat and pressure. Alternatively, hot melt lamination or thermal lamination brings two or more molten polymer layers together outside the extrusion die, usually at a nip roll or at the top roll of a roll stack.

Extrusion lamination involves first a formation of one layer by any known process, followed by extrusion of a tie layer and/or second layer onto the first layer. In an extrusion molding process, a structure having polar polymer and biopolymer layers (or an alloy of acrylic polymer and biopolymer) is placed into a mold, and a substrate polymer is injected behind it.

Coatings are applied at viscosities of 0.1 to 5000 cps, and preferably from 1-500 cps. The coating in the invention can be applied by any means known in the art, including but not limited to inkjet, roll-coat, brush-coat, gravure print, flexographic print, thermal transfer coat or by a spray apparatus. The coating is applied at a dry film thickness of 0.5 microns to 100 microns with a preferred range of 5 to 30 micron. Multiple coating layers can be applied sequentially. The coating could be done in-line or off-line, including by extrusion coating.

The multilayer structure can have any given geometry, including but not limited to, a flat sheet, a rod, or a profile.

Uses:

The multilayer structure of the invention can be used by itself to form useful objects by known means, or can be combined with additional layers of materials.

The multilayer structure can be in a sheet form and thermoformed into an object, including but not limited to, automotive parts, recreational vehicles, bathtubs, shower stalls, counters, appliance housings and liners, building materials, doors, windows, siding, decking, railings and shutters, lawn and garden parts, and storage containers.

The multilayer structure could also be directly coextruded into a profile, such as, but not limited to, deck board, hand rail siding, and window profiles.

In one embodiment, the multilayer structure is used as a cap material to provide an aesthetic covering having improved weathering and durability to a substrate. In this case, the polar polymer forms the outer layer, and the biopolymer/acrylic layer is next to the substrate. The multilayer structure can be attached to the substrate either inherently using heat or radiation, or by the use of an adhesive or tie layer. The substrate layer is at least twice as thick as the capstock, preferably at least five times as thick. The substrate layer can be between 50 microns and 10 cm, preferably from 0.2 mm to 10 cm. The substrate may be another polymer (thermoplastic, elastomeric, or thermoset) such as non-limiting examples polystyrene (PS), high impact polystyrene (HIPS), acrylonitrile/butadiene/styrene (ABS), styrene/butadiene or styrene/isoprene (SBS/SIS), hydrogenated SBS/SIS, polyolefin derivatives such as polypropylene, polyethylene, thermoplastic polyolefin copolymers, polyvinyl chloride (PVC), biopolymers, pultruded polyester or polyurethane composites; or can be a non-polymer material including, but not limited to paper, metal, ceramics, glass, etc.

In one embodiment, a single or multilayer structure that includes the outer polar polymer is used as a capstock over a biopolymer/acrylic substrate—forming a multi-layer structure.

It was found that an outer polar polymer layer over an inner biopolymer/acrylic layer over a substrate surprisingly provides improved impact resistance.

Some non-limiting examples of multi-layer structures anticipated by the invention include those listed below (PLA being used generically to mean PLA itself or where PLA can be substituted with other biopolymers). Based on the disclosure herein, one of ordinary skill in the art can imagine other useful structures of the invention.

1. Polar polymer (coating or extruded layer) over a PLA/acrylic layer, further used as a cap stock over a substrate.
2. A 3-layer construction of polar polymer/PLA-acrylic alloy/polar polymer.

3. Polar polymer as a cap or coating over a PLA-acrylic substrate.
4. Any of the above structures 1-3 in which one or more of the layers is impact-modified.
5. Any of the above structures having an adhesive or tie layer between one or more layers.
6. Any of the above structures in which the substrate layer contains from 5 to 95 weight percent, and preferably from 20 to 80 weight percent of rework. The rework being recycled material of the whole multi-layer structure.
7. A n outer layer that is a blend of an acrylic polymer, PLA, and polyvinylidene fluoride.

EXAMPLES

Example 1

Demonstrating the adhesive strength of a three-layer sheet made of an acrylic outer layer over an inner layer of biopolymer/acrylic alloy over an acrylonitrile-butadiene-styrene (ABS) substrate.

Several multilayer sheets were made by coextrusion of an outer layer of an impact modified acrylic (Solarkote® A) over a polylactic acid/acrylic modified with an acrylic impact modifier (PLA/PMMA-IM) inner layer over an ABS substrate layer. The PLA/PMMA-IM layer contained 33% acrylic core-shell impact modifier and PLA content was varied from 30 to 50%. (PLA used was Natureworks INGEO® 2003D)

All multilayer sheets showed excellent adhesion between both the Solarkote® A layer and the PLA/PMMA-IM layers and between PLA/PMMA-IM layers and the ABS layer. The layers could not be manually separated.

Example 2

Comparing impact strength of coextruded sheet made of biopolymer acrylic inner layer with a polar polymer outer layer to a coextruded sheet made of acrylic inner layer with a polar polymer outer layer.

The following 2-layer sheets would be formed by coextrusion:
A.) A acrylonitrile-styrene acrylic (ASA) outer layer and a PLA/PMMA-IM inner layer
B.) An ASA outer layer and an acrylic polymer modified with an acrylic impact modifier (PMMA-IM) inner layer
C.) A High Impact Polystyrene (HIPS) outer layer and a PLA/PMMA-IM inner layer
D.) A HIPS outer layer and a PMMA-IM inner layer Multiaxial impact testing would be performed at various temperatures, using a Instron Dynatup 9250G tester. The total energy reported in the case of A&C (having a PLA/PMMA-IM inner layer) would be expected to be significantly increased, as compared to B&D (having a PMMA-IM inner layer).

Example 3

Comparing the weatherability of an extruded PLA sheet impact modified with an acrylic impact modifier (PLA-IM) compared to a coextruded PLA-IM sheet with a polar polymer outer layer—each over an ABS substrate.

The following 2-layer sheets would be formed by coextrusion:
E.) Extrusion of an PLA-IM sheet can be performed.
F.) Coextrusion of a PLA-IM inner layer with an acrylic outer layer can be performed.
G.) Coextrusion of a PLA-IM inner layer with an ASA outer layer can performed.

Optical property measurements can be performed using a BYK Gardner Haze-Gard plus. Samples would be exposed to weathering in Florida. At 6 month intervals, optical properties would be measured. The use of an acrylic or ASA outer (F&G) layer would be expected to prevent deterioration of optical properties and prevent physical degradation of the sample as compared to pure PLA-IM (E) without an added outer layer.

The invention claimed is:
1. A multilayer structure, having at least three layers, said multilayer sheet comprising, in order:
a) at least one outer layer, covering the inner layer, comprising a thermoplastic polar polymer matrix, being on the outer side of the structure exposed to the environment, wherein said thermoplastic polar polymer matrix is selected from the group consisting of acrylic-based polymers, styrenic-based polymers, polycarbonate, polyvinylidene fluoride, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-butadiene-styrene (MBS) copolymers, styrene-butadiene copolymers, styrene-butadiene-styrene block (SBS) copolymers and their partially or fully hydrogenated derivatives, styrene-isoprene copolymers, styrene-isoprene-styrene (SIS) block copolymers and their partially or fully hydrogenenated derivatives, styrene-(meth)acrylate copolymers, styrene-methyl methacrylate copolymers (S/MMA) and compatible mixtures thereof,
b) at least one inner layer comprising a biopolymer/acrylic polymer alloy, wherein said alloy is a single intimate mixture, and wherein said acrylic polymer is an acrylic copolymer having from 70-99.5 weight percent of methyl methacrylate units, and 0.5 to 30 weight percent of one or more $C_{1-8}$ straight or branched alkyl acrylate units,
c) a substrate layer, said biopolymer/acrylic layer, b), being between the substrate layer and the polar polymer layer, with layers a) and b) forming a capstock, said capstock making up from 5 to 25 percent for the thickness of the multi-layer structure.

2. The multilayer structure of claim 1, wherein said polar polymer is acrylonitrile-styrene-acrylate.

3. The multilayer structure of claim 1, wherein said polar polymer comprises a blend of polyvinylidene fluoride (PVDF) and acrylic polymer, or a blend of PVDF, acrylic polymer and biopolymer.

4. The multilayer structure of claim 1, wherein said biopolymer/acrylic alloy layer comprises 2 to 95 weight percent of one or more acrylic polymers and 5 to 98 weight percent of one or more biopolymers.

5. The multilayer structure of claim 1, wherein said biopolymer comprises at least one polymer selected from the group consisting of polyesters, cellulosic esters, polyamides, starch and starch derivatives, shellac, sugars, polypeptides, nucleic acids, zein, cellophane, plastarch, polycaprolactone, polyglycolide, chitosan, polylactic acid, polyhydroxyalkanoates, polyesteramide, polybutylene succinate, adipate, cellulose acetate, cellulose triacetate, cellulose propionate, cellulose acetate propionate, cellulose acetate butyrate, polyhydroxy butyrate, and cellulose acetate phthalate.

6. The multilayer structure of claim 5, wherein said biopolymer comprises polylactic acid, and/or polyhydroxy butyrate.

7. The multilayer structure of claim 4, wherein said alloy comprises 20-80 weight percent of one or more acrylic polymers and 20 to 80 weight percent of one or more biopolymers.

8. The multilayer structure of claim 1, wherein one or more layers further comprises 5 to 60 weight percent of one or more impact modifiers, based on the total weight of the matrix polymer and all additives.

9. The multilayer structure of claim 8 wherein said impact modifier is a core-shell impact modifier having a hard core layer and one or more shells with a Tg of greater than 0° C., and one or more intermediate elastomeric layers with a Tg of less than 0° C.

10. The multilayer structure of claim 1, wherein one or more layers further comprises additives selected from the group consisting of stabilizers, plasticizers, fillers, coloring agents, pigments, antioxidants, antistatic agents, surfactants, toner, refractive index matching additives, additives with specific light diffraction, light absorbing, or light reflection characteristics, and dispersing aids.

11. The multilayer structure of claim 1, wherein said structure further comprises one or more adhesive or tie layers.

12. The multilayer sheet structure of claim 1 wherein said substrate is selected from the group consisting of glass, metal, ceramic, paper, thermoplastic polymers, thermoset polymers, polystyrene, polystyrene derivatives, high impact polystyrene (HIPS), acrylonitrile/butadiene/styrene (ABS), styrene/butadiene or styrene/isoprene (SBS/SIS), hydrogenated SBS/SIS), polyolefin derivatives, polypropylene, polyethylene, thermoplastic polyolefin copolymers, polyvinyl chloride (PVC), biopolymers, pultruded polyester, and polyurethane composites.

13. The multilayer structure of claim 1, wherein a layer comprising said biopolymer/acrylic polymer alloy is in a cellular or foamed form.

14. The multilayer structure of claim 1, where the overall structure thickness is from greater than 0.25 mm to 10 cm.

15. The multilayer structure of claim 1, wherein said structure is part of an object selected from the group consisting of automotive parts, recreational vehicles, bathtubs, shower stalls, counters, appliance housings and liners, building materials, doors, windows, siding, decking, railings and shutters, lawn and garden parts, storage containers, deck board, hand rail siding, and a window profile.

16. The multilayer structure of claim 1, wherein said substrate comprises from 5 to 95 percent by weight of rework.

17. The multilayer structure of claim 1, wherein said polar polymer layer is a coating of from 0.5 micron to 100 microns comprising at least 50 percent by weight of methylmethacrylate units.

18. The multilayer structure of claim 1, wherein said polar layer has a thickness of greater than 50 microns and consists of a non-acrylic polymer.

* * * * *